United States Patent [19]
Leese

[11] Patent Number: 5,925,296
[45] Date of Patent: Jul. 20, 1999

[54] MANUFACTURE OF STRUCTURAL MEMBERS FROM SOLID WASTE

[76] Inventor: Wilbert E. Leese, 4560 Cole Rd., Hillsdale, Mich. 49242

[21] Appl. No.: 08/780,397

[22] Filed: Jan. 8, 1997

[51] Int. Cl.⁶ .................................................. B29C 47/00
[52] U.S. Cl. ........................... 264/70; 264/112; 264/115; 264/920
[58] Field of Search ................... 264/920, 112, 264/115, 70

[56] References Cited

U.S. PATENT DOCUMENTS

| | | | |
|---|---|---|---|
| 3,239,881 | 3/1966 | Larsen | 264/70 |
| 3,523,147 | 8/1970 | Hold et al. | 264/70 |
| 4,081,259 | 3/1978 | Bassin et al. | 264/45.5 |
| 4,145,389 | 3/1979 | Smith | 264/920 |
| 4,225,640 | 9/1980 | Erb | 264/920 |
| 5,201,020 | 4/1993 | Kannabiran | 385/113 |
| 5,503,788 | 4/1996 | Lazareck et al. | 264/920 |
| 5,523,328 | 6/1996 | Rosenbaum et al. | 264/115 |

*Primary Examiner*—Jan H. Silbaugh
*Assistant Examiner*—Dae Young Lee
*Attorney, Agent, or Firm*—Young & Basile, P.C.

[57] ABSTRACT

The method and apparatus for forming a structural member from solid waste which consists of comminuting or shredding solid waste into particles one inch or smaller, adding a small amount of a thermoplastic material such as polyurethane or polyethylene to produce bonding, then heating the mixture and forcing the heated mixture through a restrictive extrusion die under high compression which forms the same in a predetermined transverse cross sectional configuration. Thereupon, the shaped compressed mixture is allowed to cool while maintaining the predetermined shape, and upon cooling, a thermoplastic cover encapsulates the compressed shaped product. The structural member is then cut into the desired lengths.

2 Claims, 1 Drawing Sheet

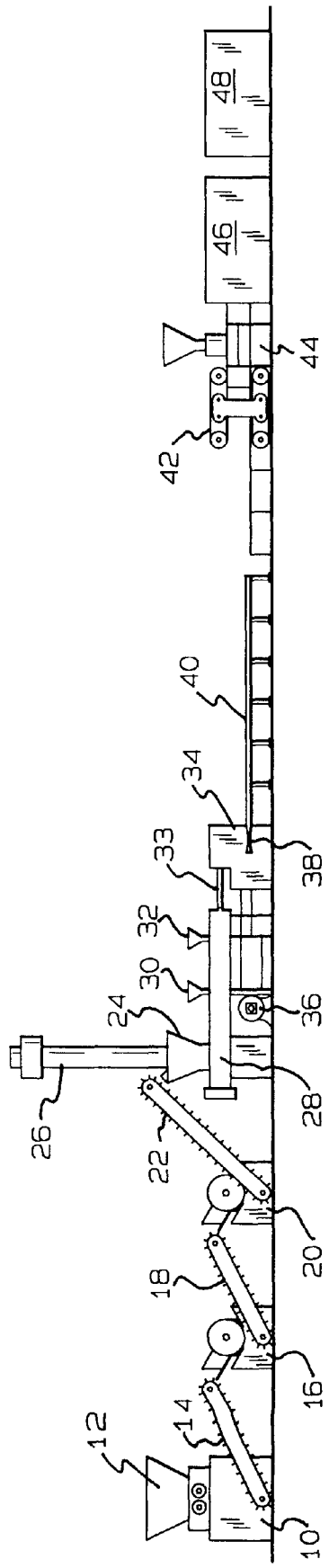
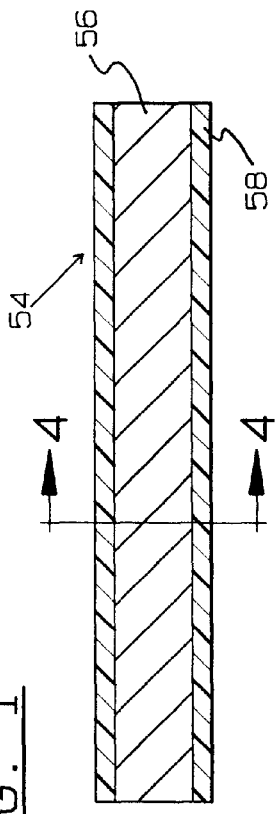
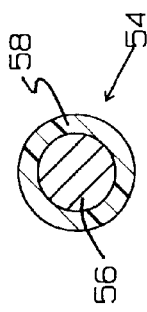
FIG. 1
FIG. 2
FIG. 3
FIG. 4

MANUFACTURE OF STRUCTURAL MEMBERS FROM SOLID WASTE

BACKGROUND OF THE INVENTION

1. Field of the Invention

The invention pertains to the method of forming structural members of compressed particles of conventional solid waste, and the structural member so formed.

2. Description of the Related Art

In an effort to conserve the world's resources, the recycling of materials is a growing industry. However, as the world's population expands, only a relatively small portion of waste materials are recycled and the amount of waste materials incinerated and disposed of in landfills increases. Heretofore, an effective and universal use of solid waste materials has not been found.

OBJECTS OF THE INVENTION

An object of the invention is to provide a method of effectively utilizing a wide variety of solid waste materials to form structural members of diverse shape and configuration and of sufficient strength as to be used in a variety of applications.

Another object of the invention is to provide a method and apparatus for forming structural members of conventional solid waste materials wherein only small amounts of bonding and adhesion components are required, and heat and compressive forces are utilized to achieve primary bonding of the structural member ingredients.

Yet another object of the invention is to provide a method and apparatus for forming structural members of solid waste material wherein the finished structural member is of a uniform and attractive appearance, and may be used in a wide variety of applications, the fact that the structural member is formed of waste materials not being apparent to the observer.

SUMMARY OF THE INVENTION

The structural members formed in accord with the invention may be produced from a wide variety of residential or commercial solid waste, such as from particles of paper, glass, synthetic plastics, metal and plastic cans, wood, bones, tires, cardboard, foams, thermoset and thermoplastic synthetics, sheet metal, grass clippings, leaves, leather, fabrics, and the like. Accordingly, in the practice of the invention, many solid waste materials heretofore incinerated or discarded in landfills may be utilized.

Solid waste, such as that mentioned above, is comminuted by shredders and hammermills into particles one inch or smaller in size. These small particles are then conveyed to a mixer wherein a small amount of a thermoplastic material such as polyurethane or polyethylene is added in pellet or liquid form. Only small amounts of polyurethane or polyethylene materials need be added.

During the mixing of the above components, heat is added to heat the mixture to accelerate bonding, and the resultant mixture is forced through a restrictive converging die under very high compression forces, preferably by an oscillating impact hammer.

The restrictive die is of a predetermined transverse cross sectional configuration to shape the structural member as desired. The die may be formed of a cylindrical shape, of a wide configuration as to form a board or plank, or any other extrudable shape.

After the hot shaped product exits the restrictive die, it enters a confining mold which is heated to a lesser degree than the heat generated in the restrictive die, and the shaped product is permitted to slowly cool in the mold as it passes therethrough. The cooled shaped product then preferably passes through a cross head extruder die wherein a synthetic plastic material such as polyvinyl chloride is extruded about the configuration of the compressed and shaped product. The encapsulated core of comminuted waste material and its cover cool, and the product can then be severed into predetermined lengths.

The above described process is a continuous fabrication process wherein a continuous length of encapsulated finished product exits the final extruder and cooling table, and by severing the cool encapsulated product to desired lengths, handling and packaging of the final product may be easily accomplished. However, it is also to be understood that the encapsulation step can constitute a separate step as the compressed waste material could be encapsulated by dipping, lay-up, painting or the like.

The polyvinyl chloride thermoplastic cover will impart a constant color, such as white or any desired color, to the finished product, and although the polyvinyl chloride cover may only be from approximately 0.050 to 0.075 inches thick, the cover, due to its close bonding and circumscribing of the core, provides a significant additional strength to the structural member.

BRIEF DESCRIPTION OF THE DRAWINGS

The aforementioned objects and advantages of the invention will be appreciated from the following description and accompanying drawings wherein:

FIG. 1 is an elevational schematic view of a typical production line for forming structural members in accord with the invention, FIG. 2 is an elevational longitudinal diametrical sectional view of a typical restriction die as used to form a cylindrical structural member in the practice of the invention, FIG. 3 is an elevational longitudinal sectional view of a structural member formed in accord with the invention, and FIG. 4 is an elevational transverse sectional view of the structural member of FIG. 3 as taken along Section 4—4 thereof.

DESCRIPTION OF THE PREFERRED EMBODIMENT

With reference to FIG. 1, a typical production line for producing a structural member in accord with the invention is illustrated.

At the beginning of the line, a shredder 10 is supplied by a hopper 12 for initially shredding the solid waste utilized with the invention. Such solid waste is typical residential and commercial discards, such as garbage, paper, glass, plastics, metal and plastic cans, wood, bones, tires, cardboard, foam, thermoset plastics, sheet metal, grass clippings, leaves, shoes, clothing, etc. The shredder 10 is, of course, of a heavy duty nature capable of shredding into small pieces such waste material. In most cases, the shredder 10 is not capable of shredding thick metal plates, heavy castings, or similar metal parts, but upon such materials being previously reduced to small particles, the same may be utilized in the inventive concepts.

A conveyor 14 transfers the shredded waste from shredder 10 to the first hammermill 16 wherein the waste particles are further reduced in size and comminuted. The output of the hammermill 16 is transferred by conveyor 18 to a second hammermill 20 which further reduces the waste partical size and discharges into outlet conveyor 22. The waste particles received upon conveyor 22 will all be relatively small, at least less than one inch in the greatest dimension, and the waste material upon the conveyor 22 is discharged into hopper 24 of the vertical mixer 26 which includes a vertical screw auger for mixing the materials received within hopper 24.

In addition to the comminuted waste materials being deposited in hopper 24 to those received from conveyor 22, fly ash or baking soda is fed into the hopper 24 for mixing with the shredded waste to control the rate of bonding of the waste. The amount of such material added will vary as determined by the nature of the garbage and the amount of binder added, for instance, for one ton of solid waste, one pound of baking soda and one pound of fly ash may be supplied to hopper 24.

The mixture passes from mixer 26 to the horizontal mixer 28 which also contains a rotating spiral auger. Mixer 28 contains an inlet hopper 30 in which polyethylene, isocyanates or polyurethane is supplied to the mixture within extruder mixer 28 in pellet or liquid form. As the mixture continues to the right, FIG. 1, along the extruder mixer 28, a second hopper 32 permits additional polyethylene or other thermoplastic binder to be added to the mixture. The extruder mixture 28 is heated to raise the temperature of the mixture therein, and the extruder mixture discharges through the heated tip 33 into the high pressure extruder 34.

The heated mixture within extruder 34 is compacted within a chamber by a driver 36 which is preferably of a reciprocating piston ram type wherein successive repetitive hammer-type impacts are applied against the heated mixture to force the highly compressed mixture through a restriction die 38, later described in detail. The die 38 also highly compresses the mixture, and the temperature of the mixture within the extruder 34 elevates due to the extensive compression taking place within the die 38.

The die 38 is of a predetermined cross sectional form so that the solid waste material exiting therefrom will be shaped as desired. For instance, if a cylindrical form is to be produced, the opening within the die 38 will be cylindrical. If a board shaped planar structural member is to be formed, the orifice within the die 38 will be so shaped.

The hot shaped waste material leaving the die 38 is received within a heated mold 40 and passes therethrough as waste material is driven through the die 38. The mold 40 maintains the configuration of the waste material as defined by the die 38, and as the temperature of the heated mold 40 will be significantly less than the temperature of the mixture leaving the die 38, the shaped waste material within the mold is cooled as it moves to the right, FIG. 1.

A belt type drive feeder 42 engages the cooled shaped waste material and feeds the same into the extruder 44 which is supplied by a hopper. The extruder 44 comprises a conventional thermoplastic extruder having a die complementary in shape, but slightly larger than, the configuration of the waste material moving through the extruder. A polyvinyl chloride synthetic plastic coating or covering is extruded about the waste material at extruder 44 confining the same therein.

The encapsulated waste material core and cover defining the desired structural material is received within a cooling tank 46, which may use water or air to cool the product, and from the cooling tank 46, the product passes to the cutoff station 48 where it is cut off by conventional equipment to the desired length.

A typical die 38 is shown in FIG. 2 wherein the die orifice includes a converging die inlet surface 50 converging to the die restriction portion 52 which forms the final configuration of the waste material. The bore of the die then again enlarges, but as the waste material has been compressed, it will substantially maintain the dimension and configuration produced by the restricting throat 52.

FIGS. 3 and 4 represent a structural member 54 made in accord with the inventive concepts. The structural member includes the compressed waste material core 56 encapsulated within the thermoplastic polyvinyl chloride cover 58. The cover 58 will, preferably, be of a thickness between 0.050 to 0.075 inches, and the cover may be provided with the desired color so as to produce an attractive product. The cover 58, although thin, significantly adds to the structural strength of the member 54 due to its close restricting confinement of the core 56.

Due to the heat generated within the extruder 34 and the die 38, and due to the heating of the mixture within the extruder mixer 28, and because of the addition of the bonding material such as polyurethane, a strong bonding occurs within the particles of solid waste constituting the core 56. Accordingly, a structural member 54 is created from previously waste materials which is of sufficient strength to permit the structural member to be used in a wide variety of applications. Cylindrical structural members can be widely used as posts, columns, and the like, while relatively flat board-like structural members may be used in the usual manner of planks and boards. Because previously waste material constitutes the primary component of the structural members 54, excellent economies of fabrication are experienced while reducing incineration and landfill requirements.

Acceptable structural members constructed in accord with the invention can be made from a wide variety of waste materials and garbage. The amount of thermoplastic material such as polyurethane, polyethylene or polyisocyanates, i.e. polymers, that are added to the comminuted mixture at hoppers 30 and 32 is small, and only needs to be of such amounts as to provide a sufficient bonding of the ingredients. Household garbage is approximately forty (40%) percent by volume thermoplastic materials, and waste material of such composition requires little additional thermoplastic bonding agents. However, waste materials having lesser amounts of a thermoplastic bonding material require more bonding material added prior to final compacting and shaping. The addition of fly ash or baking soda to the mixture at hopper 24 aids in controlling the rate of bonding and increases the bonding duration sufficiently to prevent the mixture from "setting up" prior to compressing and expression through the die 38. The amounts of fly ash or baking soda that needs to be added to the mixture is directly related to the percentage of weight of the waste material comprising thermoplastic bonding material, and it will be appreciated that as it is very difficult to accurately control the percentage of ingredients of waste material or garbage utilized, that the operator will need to exercise personal judgment and know-how in the amounts of bonding delay material, and bonding material applied to the mixture as it is processed.

The encapsulation of the cooled and shaped waste material leaving the mold 40 preferably takes place in the manner described above, i.e. passes through the extruder 44 wherein a polyvinyl chloride cover surrounds the waste core. However, it is to be appreciated that the coating of the waste material can take place as a secondary operation and is not limited to an extruding process. For instance, after the shaped and cooled core leaves the mold 40, the waste material can be cut to the desired length, and then dipped in plastisol or polyvinyl chloride to produce encapsulation. Also, it would be possible to encapsulate the waste material in a reinforced fiberglass resin material wherein the cover is laid-up, and built in the manner of known glass fiber articles. Also, painting by spraying or dipping, or any other known coating processes could be used to encapsulate the waste core.

It is appreciated that various modifications to the inventive concepts may be apparent to those skilled in the art without departing from the spirit and scope of the invention.

I claim:

1. The method of continuously forming a structural member from solid waste material comprising the steps of:

(a) comminuting solid waste into small particles to form a first mixture, (b) adding and mixing fly ash or baking soda to said first mixture for bonding rate control to form a second mixture, (c) heating said second mixture, (d) adding polyurethane to said second mixture to form a heated third mixture wherein the bonding rate thereof is controlled by said fly ash or baking soda, (e) forcing the heated third mixture by successive repetitive compressive impacts while under very high compression through a heated restriction die of such size as to further raise the temperature of said third mixture to form a predetermined transverse cross section configuration, (f) passing the compressed third mixture in the predetermined cross sectional configuration through a complementarily shaped cooling mold, and (g) extruding an encapsulating cover of synthetic material over the cooled predetermining configuration of the third mixture.

2. The method of forming a structural member as in claim 1 wherein the encapsulating cover is formed of polyvinyl chloride.

* * * * *